April 1, 1958     S. M. CALDWELL, JR., ET AL     2,828,948
HEAT EXCHANGE UNIT
Filed July 6, 1954
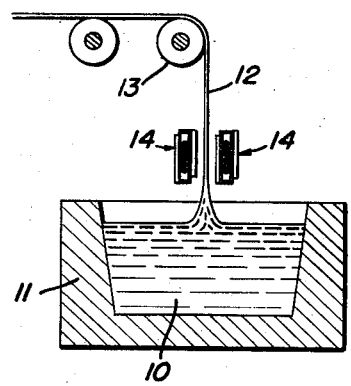
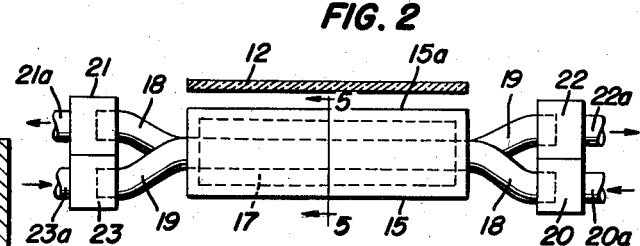
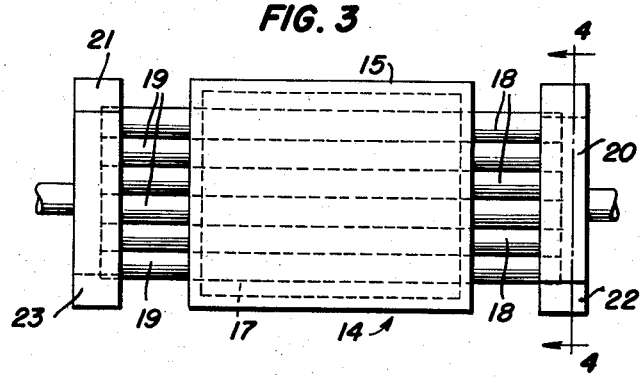
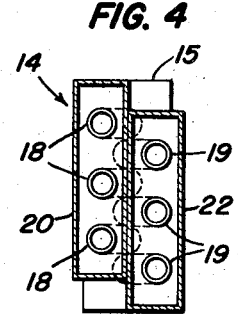
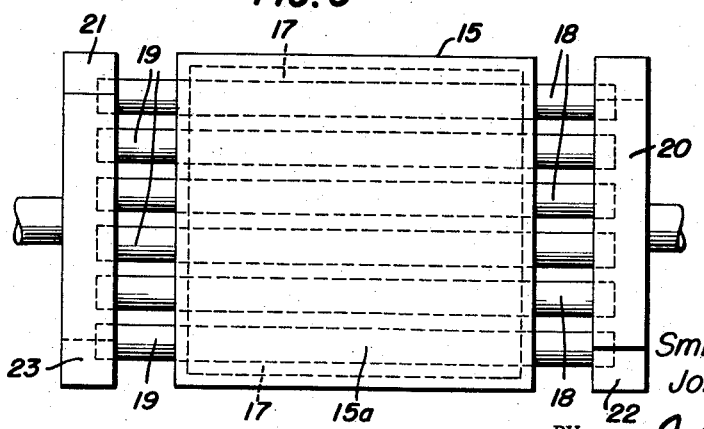
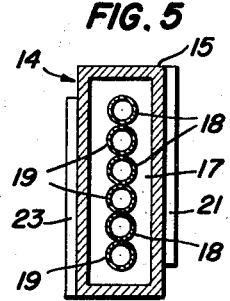
INVENTORS
Smiley M. Caldwell, Jr.
John C. Caldwell
BY
THEIR ATTORNEY

United States Patent Office 2,828,948
Patented Apr. 1, 1958

2,828,948

HEAT EXCHANGE UNIT

Smiley M. Caldwell, Jr., Clarksburg, W. Va., and John C. Caldwell, Kane, Pa.

Application July 6, 1954, Serial No. 441,512

1 Claim. (Cl. 257—256)

Our invention relates to apparatus employed in the production of glass in sheet form and more particularly to an improved apparatus for controlling the temperature of glass sheet as it is being drawn from a plastic mass.

An object of our invention is to provide a novel heat exchanger or cooler to accurately control the transfer of heat from a glass sheet in the process of being drawn by maintaining uniform temperatures along a plurality of transverse bands or areas extending longitudinally across the working surface of the cooler and obtaining simultaneously a more uniform gradation of temperatures along the length of the traveling sheet.

Another object is to provide a novel apparatus of simple and inexpensive construction for treating or conditioning a glass sheet during the drawing process in a manner that will substantially eliminate the waves, distortion, and other defects characteristic of drawn sheet glass and permit a more rapid speed at which sheets of given thicknesses are drawn from the molten bath.

Other objects and advantages of our invention in part will be obvious and in part pointed out hereinafter during the course of the following description.

Our invention accordingly resides in the combination of elements, features of construction and arrangements of parts, the scope of the application of all of which will be more fully set forth in the claim at the end of this specification.

For a more ready comprehension of our invention reference is had to the accompanying drawings, wherein:

Fig. 1 is a vertical section view of a typical sheet glass drawing apparatus showing associated therewith the heat exchangers constructed and positioned in accordance with our invention.

Fig. 2 is a plan view of one of our heat exchangers with an associated glass sheet.

Fig. 3 is an elevation view of the heat exchanger of Fig. 2.

Fig. 4 is an end view of our heat exchanger taken substantially along line 4—4 of Fig. 3.

Fig. 5 is a sectional view of our heat exchanger taken substantially along line 5—5 of Fig. 2.

Fig. 6 is an elevation view of a modified form of our invention.

In the several figures of the drawing like reference numerals indicate like parts.

As conducive to a better understanding of our invention it may be noted at this point that in glass drawing machines today employed in the manufacture of sheet glass as distinguished from plate glass, a mass of molten glass is contained in a working receptacle which is supplied from a tank furnace and a continuous ribbon or sheet is drawn from the molten mass. The primary problems that occur in a sheet glass production are to convert the molten glass to sheet form having a thickness which is uniform throughout and the surfaces of which are relatively free from imperfection.

The thickness of a finished sheet that has been drawn from a bath of molten glass is dependent chiefly upon the viscosity of the glass during the formative period and the speed at which the sheet is drawn. The drawing speed is, of course, a matter of choice and can be varied according to the desired thickness. The faster the drawing speed the thinner the sheet. Since the viscosity of the glass is determined by its temperature it is apparent that when temperatures in the forming zone are not uniform there will result sheets that vary in thickness. Similarly, differences in temperatures across the sheet in the forming zone produce alternate thick and thin streaks, distortion, and waves in the finished sheet.

To provide uniform and rapid cooling of the sheet, heat exchangers or coolers through which a coolant circulates, are generally disposed above the molten mass on either side of the travelling glass sheet near its base. The heat transfer fluid generally flows through pipes arranged within the cooler so that the fluid flow is in a direction perpendicular to the direction of the travelling sheet or across the sheet width. Cooling across the entire sheet width is therefore provided for and by using a plurality of overlying pipes continuous cooling along the sheet length is obtained. Coolers have been constructed in such a manner that there is a counterflow of the coolant through adjacent pipes in order to improve the uniformity of the temperatures on the cooler surfaces.

Although temperature control of the sheet glass while it is setting in its final form has been substantially improved with previous designs, there has been, nevertheless, a need for further uniformity in the cooler working surface temperatures and consequently the sheet temperatures. There is generally a variation in temperature across the sheet width along any transverse band due to the increase in the coolant temperature as it moves through the cooler. In general this has not been completely eliminated by providing counterflow construction. Similarly, the temperatures along the length of the sheet which are changing as the sheet moves past the cooler may not vary uniformly due to the variance of the coolant temperature in each pipe where the coolant is flowing simultaneously through a series of overlying pipes.

It is therefore the outstanding object of our invention to provide a heat exchanger to be used with sheet glass drawing apparatus with an improved counterflow construction which at all points on any transverse band along the width of the cooler working surface the temperature will be substantially the same to provide a uniform temperature across the width of the glass sheet opposite a particular band, and in which the temperature of the sheet between adjoining bands as it changes from a semi-plastic to a rigid state will vary uniformly along the sheet width to produce a glass sheet of uniform thickness and substantially free from imperfections.

The heat exchanger of our invention can be fabricated in an easy and efficient manner, and is one of very low cast due to its simple construction.

Referring now more particularly to the practice of our invention, we assemble a plurality of tubes of generally equal length and diameters and in overlying relationship with parallel axes wherein the tubes lie in a vertical plane with an enclosing shell. The enclosing shell is rectangular in shape and is provided with a space between tubes and interior shell wall as seen in the drawings. The various parts of our heat exchanger are preferably constructed of a heat-resistant and corrosion-resistant metal of a tough and durable composition. The inner tube sections enter the enclosing shell at one end wall and leave at the opposite end wall and are supported only at the points where they contact the end walls. These tubes accommodate the flow of a suitable heat transfer fluid used to conduct heat away from the working surface of the cooler.

In order to obtain counterflow action through these pipes, entrance and discharge manifolds are provided adjacent the shell at either end. On each side of the shell we offset alternate tube ends outwardly in opposite directions immediately adjacent where the ends protrude from the end walls of the shell. All the tube ends which are aligned in each direction therefore constitute a vertically aligned bank which communicates with a fluid manifold. By providing a pair of manifolds at either end of the shell a heat transfer medium or coolant can be fed through the cooler tubes with the flow through one bank in one direction and the flow through the other bank or alternate tubes in the other direction. With this arrangement we provide in each pair of associated manifolds a supply and discharge passage. A desirable counterflow action is obtained giving excellent heat transfer action.

The enclosing shell which surrounds the pipe sections throughout their straight passages provides a space within which we seal a heat transfer medium or coolant either liquid or gas as desired. The inner tubes are therefore virtually encompassed by the reservoir of coolant which serves as the heat transfer medium between the working surface of the shell and the internal tubes.

As specifically illustrative of the structure of our invention attention is directed to Figs. 1–5 of the drawing. A general type of glass drawing apparatus is shown in Fig. 1. The molten glass 10 from which the sheet 12 is to be drawn is contained in a drawpit 11. This drawpit or working receptacle is of a type generally associated with sheet glass forming apparatus and is supplied with molten glass from a glass furnace.

Sheet 12 is continuously drawn upwardly from the surface of the molten bath 10 and while still in a semiplastic condition, although substantially set in its final sheet form, is deflected into the horizontal plane about a bending roll 13. The sheet continues on and is processed as desired.

In accordance with our invention heat exchangers or coolers 14 are positioned on either side of the sheet 12 just above the molten glass level at the base of the sheet. These coolers extend the full width of the sheet as seen in Fig. 2 in order to provide for the transfer of heat from the entire sheet width to maintain a constant sheet width during the vertical movement of the sheet through the cooling area. In the prior art, rollers, which may or may not be knurled, have been employed to maintain the sheet width as it travels through the forming zone. With the arrangement and structure of our cooler these can be eliminated if desired.

The enclosing shell 15 of our cooler 14 is of a generally rectangular shape (see Figs. 3 and 5) and of sufficient size to accommodate a central section of tubes 18 and 19 and also allow a space 17 between shell 15 and the tubes, for the heat transfer medium as previously indicated. The vertical portion of jacket 15 which faces the glass sheet surface, indicated at 15a, is the working surface of the cooler to which the heat from the sheet is immediately transferred.

The tubes 18 and 19, having substantially straight central portions and equal diameters, extend through the shell body. These sections are arranged horizontally with the axis of each pipe parallel to the longitudinal axis of the shell. As shown in Fig. 3 the tube sections overlie each other in such manner that their surfaces are in direct contact along their straight portions (see also Fig. 5 at 9). The pipes preferably are supported by the shell only at the points where they enter and leave. If desired, however, bracing members or supports can be employed within the shell, so long as the supports do not come in contact with the working surface of the shell. The pipe sections accommodate the flow of a desired heat transfer medium employed for cooling the surrounding medium 17 and in turn the working surface 15a of the shell. Although a minimum of two tubes is to be utilized, we preferably use a higher even number, for example, six. It may be desirable for a particular unit to use less or more than six and it is understood that we do not intend to restrict our design to the particular number.

We provide an arcuate bend or off-set at both ends of tubes 18 and 19 in such manner that the arcuate portion commences at a point on the tube adjacent to where the tube projects from the shell wall. Each individual tube is so bent or off-set at its ends that its bent portion extends approximately laterally toward opposite sides of the shell. Although tubes 18 and 19, which are arranged alternately in vertically aligned relationship are similar in shape, they are so located that in any pair of tubes constituting one of each tube 18 and 19, the off-set portions at either end extend in opposite lateral directions. Therefore, as seen in Fig. 2, all of the off-set portions of tubes 18 at each group of ends are in vertical alignment as well as all of the off-set portions of tubes 19 at their two groups of ends. The plurality of tubes 19 and tubes 18 which are in vertical alignment provide tube banks at either end of the shell.

We provide manifolds as shown in Fig. 2 for fluid distribution to control the heat transfer medium flowing through the tubes. Manifolds 20 and 21 provide fluid communication at either end of tubes 18 and manifolds 22 and 23 provide fluid communication at either end of tubes 19, respectively. Fluid communication to supply and discharge ducts is provided for each manifold by means of suitable pipes 20a, 21a, 22a and 23a. As shown by the arrows in Fig. 2, fluid is supplied to manifolds 23 and 20 on opposite sides of the shell and flows in opposing directions through tube banks 18 and 19 to subsequently discharge through manifolds 21 and 22. With this counterflow arrangement in our heat exchanger a high degree of heat transfer is obtained.

A uniformity of heat transfer is assured by the heat-exchanger medium confined in the space 17 between shell 15 and tubes 18 and 19. This medium, which washes the interior walls of the shell and the exterior walls of the tubes, compensates for any irregularity introduced by the curved surfaces of the tubes.

In the glass drawing operation, the working surface 15a of the heat exchangers 14 are exposed to the hot surface of the sheet 12. The fluid contained in the cavity 17, therefore, serves as the medium by which the heat is transferred from the surface 15a to the cooling fluid flowing within the tubes 18 and 19. Efficiency of transfer is achieved because of the complete physical contact had between fluid and the tubes. By means of the cooperating cooling effect of the fluid in the tubes, due to its counterflow arrangement and the property of the cavity fluid to evenly distribute heat, we obtain the desirable quality of high degree of uniformity of the temperatures along the shell working surface 15a. The variation of temperature is held to an absolute minimum. With uniform temperatures we eliminate the usual variations in sheet glass thicknesses due to inadequate temperature distribution and obtain a glass sheet which is substantially free from waves, distortion, and other defects.

With the simple and highly efficient structure of our invention, it can be arranged also to transfer heat in materials of a multitude of forms. By fabricating the cooler in a circular form it can be adapted for use with tubes, rolls or drums. Likewise, as it is adapted to transfer heat, our heat exchanger can be effectively used for both cooling and heating purposes by controlling the temperature of the coolant employed.

A modification of our invention is shown in Fig. 6. The construction of this embodiment of our heat exchanger is identical to that of Fig. 3 except that tubes 18 and 19 do not have contacting surfaces, but instead the tubes are spaced apart to provide a gap between their outer surfaces, a construction giving perhaps greater efficiency in transferring heat between the tube surfaces and the cavity medium.

It is apparent from the foregoing that once the broad aspects of our invention are disclosed, many embodiments thereof and many modes of application all falling within the scope thereof, will readily occur to those skilled in the art. Moreover, many modifications of the particular embodiment herein disclosed will likewise suggest themselves. Accordingly, we intend to be limited only by the scope of the following claim and we make the foregoing disclosure solely by way of illustration.

We claim as our invention:

In a heat exchanger of uniform surface temperature for glass drawing apparatus a closed receptacle having side walls and end walls forming a sealed compartment, a heat transfer fluid within said compartment, a plurality of substantially straight tubes supported by said end walls within said receptacle in vertical overlying relationship and spaced from said side walls with ends terminating without the receptacle, with alternate tube ends having off-set portions curving outwardly, to form one bank of alternate tubes and the other alternate ends curving outwardly in opposite direction to form another bank of alternate tubes, and fluid manifolds communicating with each bank to direct the flow of a heat transfer medium through the same in opposite directions.

References Cited in the file of this patent

UNITED STATES PATENTS

| | | |
|---|---|---|
| 695,041 | Fues | Mar. 11, 1902 |
| 1,574,984 | McKinley | Mar. 2, 1926 |
| 1,751,725 | Cross | Mar. 25, 1930 |
| 1,865,811 | Amsler | July 5, 1932 |
| 2,000,539 | Scheide | May 7, 1935 |
| 2,179,702 | Saunders | Nov. 14, 1939 |
| 2,538,014 | Kleist | Jan. 16, 1951 |
| 2,607,168 | Drake | Aug. 19, 1952 |
| 2,608,798 | Sharp | Sept. 2, 1952 |
| 2,655,765 | Walters | Oct. 20, 1953 |

FOREIGN PATENTS

| | | |
|---|---|---|
| 653,570 | Great Britain | May 16, 1951 |